Dec. 6, 1955
W. T. HONISS
2,725,682
MEANS FOR APPLYING HEAT EXTERNALLY TO THE
ORIFICE RING OF A MOLTEN GLASS FEEDER
Filed May 11, 1954
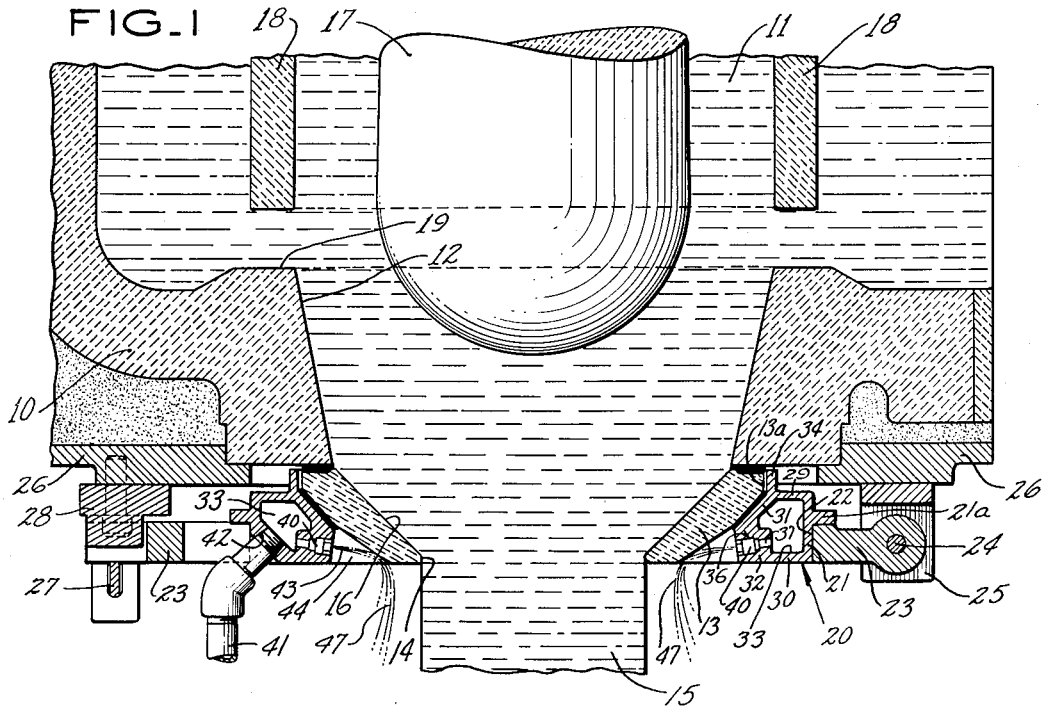
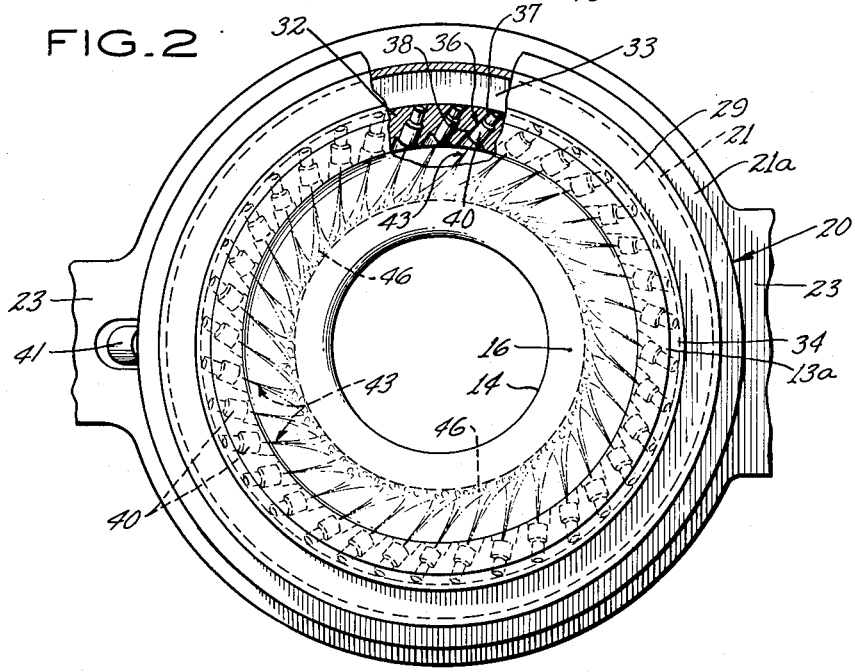
INVENTOR
WILLIAM T. HONISS
BY Bates & Willard
ATTORNEYS

2,725,682

United States Patent Office

Patented Dec. 6, 1955

2,725,682

MEANS FOR APPLYING HEAT EXTERNALLY TO THE ORIFICE RING OF A MOLTEN GLASS FEEDER

William T. Honiss, West Hartford, Conn., assignor to Emhart Manufacturing Company, Hartford, Conn., a corporation of Delaware Application May 11, 1954, Serial No. 428,967

1 Claim. (Cl. 49—55)

This invention relates to improvements in glass feeders of the type which comprises a molten glass feeding container provided with a downwardly opening outlet in its bottom through which molten glass is fed, and more particularly to means for applying heat locally to the exterior of the lower end portion of a refractory orifice ring at the lower end or bottom of the glass feed outlet of such a feeder.

In feeding glasses of certain compositions, particularly the boro-silicate glasses, through the bottom feed outlet of such a feeder, devitrification of glass inside and on the lip of the orifice ring occurs frequently enough to constitute a serious problem. It has been proposed prior to this invention to provide an annular burner around the lower portion of the orifice ring for directing radial jets of flame against the orifice ring to prevent such devitrification or objectionable cooling of the glass in the orifice ring. Such an annular burner has not satisfactorily solved the problem since its operation produces a series of separated hot spots on the orifice ring and the amount of fire from the annular burner is undesirably limited for the reason that if the flame jets are not kept short, they will be deflected off the orifice ring against the suspended mold charge mass and cause such charge mass to run out of shape.

An object of the present invention is to provide more even and adequate heating around the lower portion of the orifice ring to obviate devitrification or undesirable cooling of glass therein and in such a manner as to avoid overheating glass suspended from the orifice ring.

A more specific object of the invention is to provide an annular burner having ports arranged to direct a circular series of closely spaced jets of flame against the exterior of the lower portion of the orifice ring so as to provide a continuous ring or coil of flames in a state of turbulence around the lower portion of the orifice ring, thereby obviating separated hot spots on the orifice ring as produced by the annular burner of the prior art, and so that flames and products of combustion deflected by the orifice ring will curl outwardly and downwardly from the lower end portion of such ring without contacting the glass of a charge mass in suspension from the orifice ring, thereby removing undesirable limitations on the amount of heating flames that may be applied by the burner.

Other objects and advantages of the invention hereinafter will be pointed out or will become apparent from the following description of a practical embodiment of the invention, as shown in the accompanying drawings, in which:

Fig. 1 is a fragmentary longitudinal vertical section through the feed spout portion of a glass feeder, showing an annular burner of the present invention operatively associated with the orifice ring thereof; and Fig. 2 is a plan view of the orifice ring and annular burner assembly with portions thereof broken away to show a few of the burner ports in section.

In Fig. 1, the numeral 10 designates a refractory feed spout containing a body of molten glass 11 and having a well or outlet passage 12 in its bottom continuously submerged by the molten glass. A refractory orifice ring 13 of a generally conventional downwardly tapering or inverted frusto-conical shape is shown operatively applied to the lower end of well 12 and has a central bottom orifice 14 of reduced size in relation to the diameter of the well and through which molten glass may issue to form a suspended mold charge mass 15. The well 12 and the interior 16 of the orifice ring together provide the outlet of the feeder. Feeding of molten glass through this outlet may be under the control of a reciprocating plunger working in the glass above the outlet, the lower end or tip of this plunger being indicated at 17. Flow of glass into the upper end of this outlet may be regulated by adjusting the height of the lower end of a refractory tube 18 above a curb 19 that surrounds the upper end of the outlet.

The feeder structure and elements which have been described so far are conventional and per se do not form part of the invention.

The orifice ring 13 is supported in its operative position at the bottom of well 12 by an annular member 20 which functions both as a holder for the orifice ring and as an annular burner for applying jets of flame to the exterior of the lower portion of the orifice ring. This annular member 20 may be made of a suitable metal or any other suitable material in any suitable known way. It comprises a generally cylindrical outer wall 21 fitting in an opening 22 in a supporting arm 23 and provided with an outturned flange 21a overlying the adjacent portion of arm 23. Arm 23 may be pivotally attached at one end at 24 to a lug 25 depending from the feeder spout casing 26 and latched at its opposite end at 27 to a cooperating fixed latching structure 28 depending from the feeder spout casing 26 so that the orifice ring in annular member 20 will be releasably held in its operative position at the bottom of well 12.

The annular member 20 has a relatively narrow top wall 29, a wider substantially horizontal bottom wall 30 and an inner wall comprising an inverted frusto-conical orifice ring supporting upper portion 31 and a relatively thick lower burner port portion 32. An annular chamber 33 thus is provided in the member 20 and extends completely around the inner wall thereof. The upper portion of the orifice ring 13 rests firmly in the inverted frusto-conical portion 31 of the inner wall of member 20. Member 20 may have an upstanding flange 34 at the upper end of inverted frusto-conical portion 31 and surrounding the extreme upper end portion of orifice ring 13 which may be made externally vertical as indicated at 13a to fit in such flange.

In the example shown, the slope of the orifice ring supporting upper portion 31 of the inner wall of member 20 is approximately 45°. The outer surface of the lower portion 32 of such inner wall may have a slight reverse taper, as 8° from the vertical, so as to be downwardly enlarging instead of downwardly tapering. These specific slopes are however not critical, it being sufficient for the purpose of this invention that the contour of the outer surface of the upper portion of the inner wall of member 20 should be such as to provide firm support for the portion of the orifice ring resting therein and that the downwardly projecting exposed lower end portion of the orifice ring should diverge sufficiently from the lower burner port portion 32 of the inner wall of member 20 to leave an annular air space 44 therebetween.

This lower portion 32 of the inner wall of member 20 is provided with a series of closely spaced adjacent burner ports 36, each of which comprises an inner end portion 37 of relatively small diameter and a larger or counterbored outer end portion 38. A burner nozzle unit 40 may be provided to fit snugly in relatively enlarged outer end portion 38 of each burner port. A combustible fuel supply pipe 41 is operatively connected with an inlet port 42 in a portion of the outer wall of member 20 so as to supply a suitable gaseous fuel mixture to the chamber 33. From the chamber 33, gaseous fuel will pass through the burner ports 36 so as to be directed as jets 43 against the outer surface of the lower end portion of the orifice ring. The ports 36 are all turned laterally from the radial in the same direction, reading from the inner surface of the inner wall 32 to the outer surface thereof. This lateral slant from the radial preferably is in the order of about 20°. These ports also slant slightly downward toward their outer ends, as in the order of approximately 8°. The closely adjacent jets of flame 43 thus will be slanted laterally from the radial in a counterclockwise direction as viewed in Fig. 2, and also slightly downward as they pass through the intervening space 44 to the lower portion of the orifice ring. These jets will fan out so as to overlap and form a continuous ring or coil of flames and gaseous products of combustion against and around the lower portion of the orifice ring in the area indicated at 46. The lower end portion of the orifice ring thus will be uniformly heated without any hot spots thereon. As the jets from adjacent burner ports overlap and form the turbulent flame mass against and around the lower end portion of the orifice ring as described, deflected flames and products of combustion from such mass will curl outwardly and downwardly as indicated at 47, Fig. 1. It will be noted that these flames or gaseous products of combustion curl away from the depending molten glass charge mass of column 15. Overheating of this mold charge mass thus is avoided. Consequently, the burner may be operated to its full capacity if necessary to heat the orifice ring to the extent desired and this without any objectionable heating of the suspended mold charge mass of glass below the feeder outlet.

Obviously, many changes in and modifications of the particular illustrative embodiment of the invention shown in the drawings and hereinbefore described will now occur to those skilled in the art and I therefore do not wish to be limited to the details of this illustrative embodiment.

I claim:

Means for applying heat externally to a molten glass feeder orifice ring of inverted frusto-conical shape, comprising a hollow annular burner member having an inner wall formed with an upper portion of inverted frusto-conical shape and a lower portion which diverges downwardly from the line of slope of the upper portion, said lower portion of said inner wall being of substantial thickness and being provided with a circular series of burner ports respectively opening through its outer surface at closely spaced points, said ports communicating at their inner ends with the interior of the hollow burner member and each having a lateral slant from the radial in the same direction and a downward slant from the horizontal toward its outer end, said upper portion of the inner wall of said burner member being adapted to serve as a seat for the upper end portion only of said orifice ring so as firmly to support the orifice ring in the burner member with the lower portion of such orifice ring positioned within and spaced from the lower portion of the inner wall of said burner member, the lateral and downward slants of the ports through said lower portion of said inner wall being such in relation to the slope of the external surface of the inwardly spaced lower portion of the orifice ring that jets of flame directed thereagainst from the ports will provide a continuous ring or coil of flames in a state of turbulence around said lower portion of the orifice ring and will be deflected thereby so as to curl outwardly and downwardly therefrom away from the periphery of glass issuing downwardly from the orifice ring, said hollow annular burner member being provided with an inlet through which a combustible fuel mixture may be supplied to its interior.

References Cited in the file of this patent

UNITED STATES PATENTS

| | | |
|---|---|---|
| 1,603,196 | Cramer | Oct. 12, 1926 |
| 1,775,311 | Halle | Sept. 9, 1930 |
| 2,252,320 | Hughey | Aug. 12, 1941 |

FOREIGN PATENTS

| | | |
|---|---|---|
| 568,428 | Great Britain | Apr. 4, 1945 |